United States Patent [19]

Norr

[11] 4,085,768
[45] Apr. 25, 1978

[54] PRESSURE FLUID IMPULSE CONVERTER

[75] Inventor: Ulf Einar Sigvard Norr, Nacka, Sweden

[73] Assignee: Atlas Copco Aktiebolag, Nacka, Sweden

[21] Appl. No.: 723,314

[22] Filed: Sep. 15, 1976

[30] Foreign Application Priority Data

Sep. 17, 1975 Sweden .................................. 7510374

[51] Int. Cl.² .......................................... F16K 31/124
[52] U.S. Cl. .................................. 137/102; 137/624.15; 137/624.11
[58] Field of Search ...................... 137/624.11, 624.13, 137/624.15, 624.18, 624.2, 102, 115, 116.3; 60/537, 584, 591, 387

[56] References Cited

U.S. PATENT DOCUMENTS

| | | | |
|---|---|---|---|
| 3,489,155 | 1/1970 | Loveless | 137/624.2 |
| 3,965,797 | 6/1976 | Grisebach | 60/387 X |

Primary Examiner—Alan Cohan
Attorney, Agent, or Firm—Flynn & Frishauf

[57] ABSTRACT

A pressure fluid impulse converter for transforming primary pressure fluid impulses of a higher frequency into secondary pressure fluid impulses of a lower frequency, comprising a hydraulically actuated activating means arranged to cause a valve in a pressure fluid circuit to shift from a closed to an opened position and a positive displacement pump which is actuated by the primary pressure fluid impulses and arranged to feed motive hydraulic fluid to said activating means. The latter is thereby stepwise displaced from a rest position to a valve activating position.

9 Claims, 2 Drawing Figures

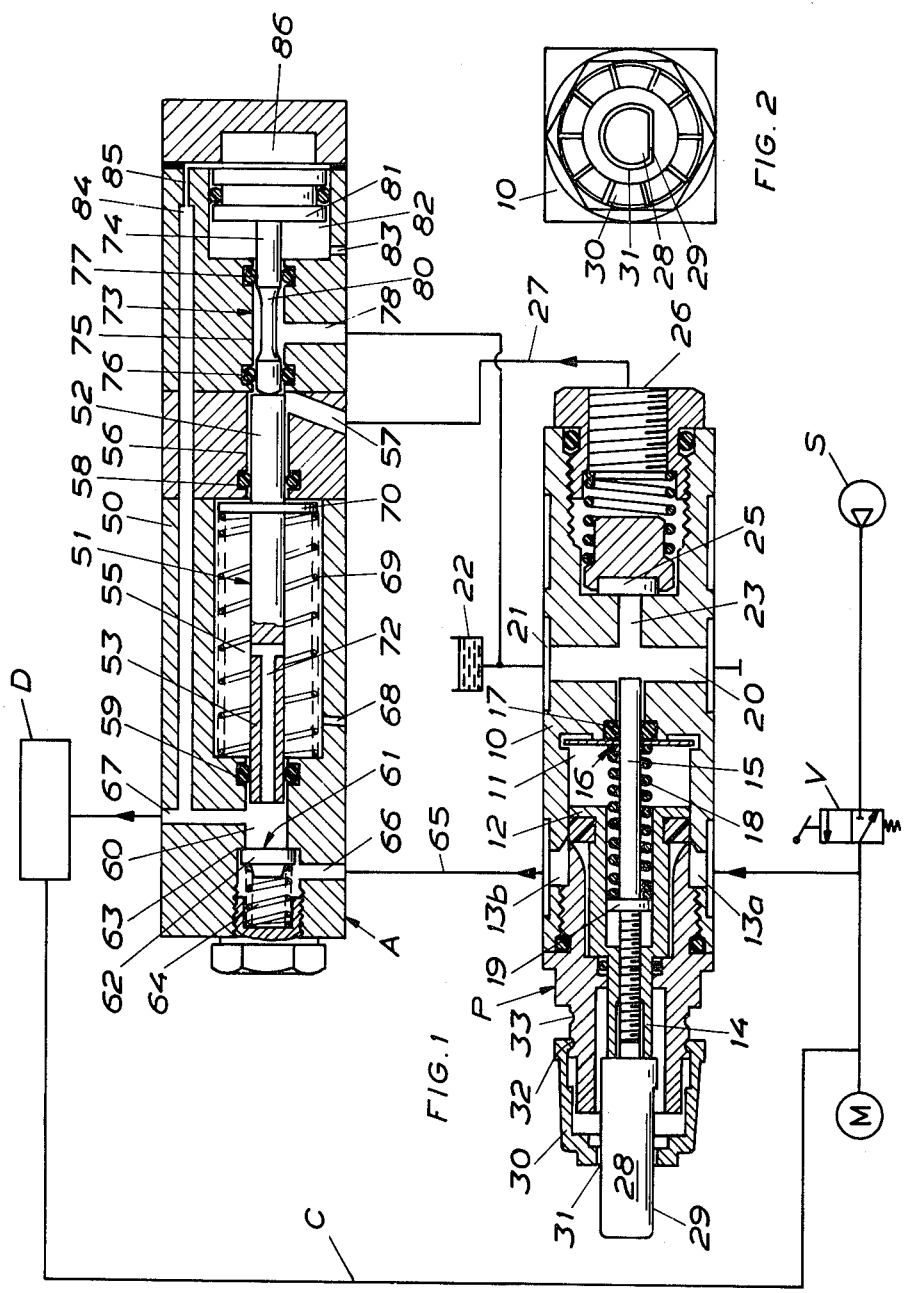

PRESSURE FLUID IMPULSE CONVERTER

This invention relates to a pressure fluid impulse converter intended for transforming at a predetermined rate primary pressure fluid impulses of a higher frequency into secondary pressure fluid impulses of a lower frequency.

Prior art devices of this type suffer from the drawbacks of being complicated in construction and expensive. These devices are bulky as well and difficult to incorporate in systems containing other components of standard size, for instance block type components.

The object of the present invention is to provide a pressure impulse converter which is simple in construction, which is small as regards outer dimensions and which can be designed to match standard type components.

A preferred embodiment of the invention is hereinbelow described in detail with reference to the accompanying drawing.

BRIEF DESCRIPTION OF THE DRAWINGS

FIG. 1 shows a longitudinal section through an impulse converter according to the invention. FIG. 1 also shows a power supply circuit for a pneumatic motor, into which circuit the impulse converter is incorporated.

FIG. 2 shows an endview of the pump P.

DETAILED DESCRIPTION

The impulse converter according to the invention comprises a pump P which is constituted by a standard type pump for supply of lubricating oil to pneumatic machines or tools. The pump comprises a housing 10 in which is formed a drive cylinder 11 and a drive piston 12 which is reciprocably guided in the drive cylinder 11.

The cylinder 11 is provided with an inlet opening 13 a, through which pressure air impulses can reach the drive piston 12. Opposite to the inlet opening 13 a the housing is provided with an opening 13 b, through which pressure air can be communicated across the pump P.

The drive piston 12 is formed with a rearwardly extending tubular neck 14. The neck 14 is provided with an internal thread by which it is connected to a rodshaped pump piston 15. By means of the thread joint the relative position of the pistons 12 and 15 may be adjusted. The pump piston 15 extends out through an opening 16 in the end wall of the drive cylinder 11. The opening 16 is sealed off by a seal ring 17. Between the end wall of the drive cylinder 11 and a flange 19 on the pump piston 15 a spring 18 acts to bias the pump piston 15 toward the rest position of the latter, to the left in FIG. 1. Due to the fact that the pump piston 15 and the drive piston 12 are connected by means of a thread joint, the drive piston too is spring loaded towards its left end position.

The pump P further comprises an inlet chamber 20 for hydraulic fluid and a pump cylinder 23 which is fully open toward the inlet chamber 20. The inlet chamber 20 communicates via an opening 21 with a hydraulic fluid reservoir 22. The pump cylinder 23 is arranged to receive the pump piston 15 under a small clearance so that hydraulic fluid trapped in front of the pump piston 15 will be pressurized and forced out of the pump cylinder 23. Hydraulic fluid that is forced out of the pump cylinder 23 has to pass a spring loaded check valve 25, the purpose of which is to prevent backflow during return strokes of the pump piston 15. Moreover, the pump P is provided with an outlet opening 26 for hydraulic fluid, which opening communicates with an activation unit A via conduit 27.

For adjusting the displacement of the pump P, the rear end of the pump piston 15 is provided with a maneuver head 28. By turning the maneuver head 28 the relative position of the pump piston 15 and the drive piston 12 is changed, and due to the fact that the drive piston 12 has a determined length of stroke in the drive cylinder 11, the intrusion of the pump piston 15 into the pump cylinder 23 is changed and thereby the displacement per stroke is changed.

In the position shown in FIG. 1 the pump piston 15 occupies its forwardmost position relative to the drive piston 12 which means that the pump is set to obtain its maximum displacement. This position of the pump piston 15 is defined by the neck 14 of the drive piston 12 which abuts against the inner end of the maneuver head 28.

The maneuver head 28 has the form of a cylindrical spindle provided with a flat portion 29 (see FIG. 2) by which it is possible to lock and turn the head.

On the rear end of the housing 10 there is attached a cap 30 which is provided with an opening 31, the form of which matches that of the maneuver head 28. However, the opening 31 is slightly larger than the head 28 so that the cap 30 can be freely moved along the head 28.

The cap 30 is movable relative to the housing 10 and is arranged to cooperate alternatively with two annular grooves 32 and 33 on the housing. In its outer position, i.e. when it engages the annular groove 32, the cap 30 is free to rotate relative to the housing 10. In this position the cap 30 is intended to be used as turning knob for the maneuver head 28. The cap 30 is coupled to the maneuver head 28 in that the flat portion 29 engages a corresponding part of the opening 31 in the cap.

As the cap 30 occupies its inner position, i.e. when it engages the annular groove 33, it is locked against rotation, which means that the maneuver head 28 and the pump piston 15 are locked as well.

The pressure impulse converter according to the invention also comprises an activation unit A. In FIG. 1 the activation unit A is shown as a separate unit and comprises a housing 50 in which is slidingly supported an activating means 51. The activating means is provided with a drive piston 52 and a push rod 53. The drive piston 52 extends from an air discharge chamber 55 into a cylinder bore 56 which is provided with an inlet passage 57 for hydraulic fluid. The passage 57 is connected to the outlet 26 of the pump P via the conduit 27. The drive piston 52 is sealed off in the cylinder bore 56 by means of a seal ring 58.

In the opposite direction the push rod 53 of the activating means 51 extends from said air discharge chamber 55 via a seal ring 59 into a valve chamber 60. The valve chamber 60 contains a seat valve 61 which comprises a valve body 62, a seat 63 and a compression spring 64 for biasing the valve body 62 toward the seat 63.

On one side of the seat 63 the valve chamber 60 is provided with an inlet passage 66 for pressure air and on the other side the seat 63 there is an air discharge passage 67. These passages 66 and 67 are so located that pressure air acts upon the valve 61 in the closing direction of the latter. Via a passage 65 the inlet passage 66 is connected to the air outlet 13 b of the pump P.

The air discharge chamber 55 of the activation unit A has an air outlet opening 68 and contains a coil spring 69 which acts between one of the end walls of the chamber and a flange 70 on the activating means 51. The purpose of the spring 69 is to push the activating means 51 to its rest position after each completed activation stroke.

The push rod 53 of the activating means 51 is formed with an axially directed passage 72 through which the valve chamber 60 communicates with the atmosphere via the air discharge chamber 55 and the opening 68.

In an extended portion of the cylinder bore 56 there is provided a return valve 73 having an elongated valve body 74 which is displaceably guided in a bore 75. The bore 75 is coaxial with the cylinder bore 56 and is provided with two relatively spaced sealrings 76 and 77, between which there is located a drain opening 78. The latter is connected to the reservoir 22.

The valve body 74 is formed with a waist 80, the length of which is less than the relative distance between the seal rings 76 and 77. The valve body 74 is also provided with an actuation piston 81 which is displaceably guided in a cylinder bore 82 in the housing 50. In the valve body part of the cylinder bore 80 there is provided an air discharge opening 83. At the opposite end of the cylinder bore 82 a passage 84 interconnects the cylinder bore 82 and the valve chamber 60.

The passage 84 contains a flow restriction 85, and the cylinder bore 82 is at its bore 75 opposite end formed with a volume 86.

In the disclosed impulse converter the pump P as well as the activation unit A are shown in their rest positions which means that no primary pressure fluid impulse has reached the device.

However, as a primary pressure impulse in the form of pressure air is supplied to the pump P via its inlet opening 13 a, the drive cylinder 11 is pressurized. Pressure air is transmitted to the opening 13 b and via the passage 65 to the inlet passage 66 of the valve chamber 60. As the valve 61 occupies its closed position the pressure air impulse cannot pass the valve chamber 60.

Within the drive cylinder 11 of the pump the received pressure air impulse accomplishes movement of the drive piston 12 toward the right in FIG. 1, which means that the pump piston 15, against the action of the spring 18, starts to perform a pump stroke. During the pump stroke the forward end of the pump piston 15 travels across the supply chamber 20 and enters the pump cylinder 23. As the supply chamber 20 is always filled up with hydraulic fluid, and as a very narrow clearance is left between the pump piston 15 and the cylinder 23, a pressure is built up in the fluid volume in front of the piston 15. As a certain minimum pressure is exceeded, the check valve 25 is opened and an amount of hydraulic fluid is let through. This amount of fluid is defined by the area of the pump piston and the actual rate of intrusion of the pump piston into the cylinder 23. The rate of intrusion can be varied by turning the maneuver head 28 so that the position of the pump piston 15 relative to drive piston 12 is changed. As the drive piston 12 has a determined stroke length defined by the length of the cylinder 11, the intrusion of the pump piston 15 into the cylinder 23 and thereby the volume per stroke can be set.

The amount of hydraulic fluid that has been pressed out of the cylinder 23 leaves the pump P through the opening 26 and is conducted to the cylinder bore 56 of the activation unit A via the conduit 27 and the inlet passage 57. The pressure of the hydraulic fluid displaces the drive piston 52 to the left in FIG. 1 against the action of spring 69. The cross section of the drive piston 52 is larger than the cross section of the pump piston 15 which means that the displacement of the activating means 51 is shorter than the intrusion distance of the pump piston 15 into the cylinder 23.

As the primary pressure impulse is over and the pressure within the drive cylinder 11 has decreased, the drive piston 12 as well as the pump piston 15 are returned to their rest positions by the spring 18. In its rest position the pump piston 15 is withdrawn from the pump cylinder 23 which is refilled with hydraulic fluid from the inlet chamber 20 and reservoir 22. Due to the fact that the check valve 25 prevents hydraulic fluid from returning into the pump cylinder 23, the fluid within the passage 27, the inlet passage 57 and the cylinder 56 is still under pressure. This means that the activating means 51 is maintained in the very position it obtained during the pump stroke of the pump P.

When receiving another primary pressure impulse through its inlet opening 13 a, the pump performs one more pump stroke which means that another determined amount of hydraulic fluid is fed into the cylinder 56 to move the activating means 51 one more step. As the primary pressure impulse is over the pump piston 15 returns, while the activating means 51 remains in its new position.

After a certain number of primary pressure impulses and pump strokes resulting therefrom, the activating means 51 has been stepwise disposed to the left in FIG. 1 such a distance that the push rod 53 abuts and moves the valve body 62 off its seat 63.

Now, pressure air may pass through the valve chamber 60 and may leave the activation unit. Pressure air is emitted through the outlet passage 67 in the form of a secondary pressure impulse.

As the valve 61 is opened, the passage 84 and the volume 86 are pressurized. This means that the spindle 74 and the actuation piston 81 of the return valve 73 are moved to the left in FIG. 1 so as to establish communication between the cylinder bore 56 and the drain opening 78. Hydraulic fluid that has been fed into the cylinder bore 56 is now returned to the hydraulic fluid reservoir 22.

As the hydraulic fluid pressure is relieved the activating means 51 is returned to its rest position, to the right in FIG. 1, and the valve 61 is reclosed. An operation cycle has been completed.

By adapting the cross section of the restriction 85 as well as the size of the volume 86 at the pressure side of the actuation piston 81 the duration of each secondary pressure impulse can be determined. The duration of the impulse is in fact that interval of time which is needed to obtain full pressure in the volume 86 and to move the valve body 74 so that the drain opening 78 is brought into communication with the cylinder bore 56.

The activating means 51 which is returned to its rest position by the spring 69 will at the end of the return movement bring the return valve 73 back to its closed rest position by abutment between the drive piston 52 and the end of the valve spindle 74. During the return movement of air behind the actuation piston 81 is pressed out through the restriction 85, the passage 84, the valve chamber 60, the passage 72 within the activating means 51, the air discharge chamber 55 and out through the air discharge opening 68. As the valve 61 is in its opened position, air is prevented from leaking out through the passage 72, the air discharge chamber 55 and the air discharge opening 68 in that the end of the passage 72 is blocked by the valve body 62.

The pressure fluid impulse converter according to the invention has three essential features by which it differs from prior art devices for this purpose.

1. The frequency transforming rate may be varied continuously in that the drive piston and the pump piston of the pump P are connected by means of a thread-joint. In prior art devices the frequency transforming rate is fixed to, for instance, three predetermined values: 1:6, 1:12 and 1:24 or 1:12, 1:24 and 1:48.
2. The frequency transforming rate is set very easily in that the maneuver head 28 is operable from outside the housing. In prior art devices the changing of the frequency transforming rate requires dismantling of the device and exchanging of cams or gears.
3. The frequency transforming rate may be varied within a wide range just by turning the maneuver head 28. In a standard size embodiment of the invention it has been possible to vary the frequency transforming rate continuously from 1:6 to 1:50.

The embodiments of the invention are not limited to the shown and described example, but can be freely varied within the scope of the invention as it is defined in the claims. For instance, the impulse converter may be designed as a single unit. Yet, the described embodiment is advantageous in that the pump is constituted by a standard type lubricating pump, having standard over-all dimensions, which means that the activation unit only has to be adapted to standard dimensions.

When using the invention in a system for regulated lubrication of pneumatic machines or tools, one or more lubricating pumps are connected to the secondary impulse outlet 67. By means of the pressure impulse converter according to the invention an amount of lubricating oil is emitted from each of the connected lubricating pumps for, for instance, every 10 primary pressure impulses from the machine.

Such an application of a pressure impulse converter according to the invention is shown in FIG. 1. A pneumatically powered machine M is connected to a pressure air source S via a control valve V. The inlet opening 13 a of the pump P is connected to the supply conduit of the machine downstream of the control valve V, and the outlet opening 67 of the activation unit A is connected to a lubricating pump D, preferably of the same type as pump P. The lubricating pump D is arranged to supply the machine M with portions of lubricating oil through a conduit C. The oil may be supplied directly into the machine or into the air supply conduit upstream of the machine as shown in FIG. 1.

One primary pressure impulse is formed each time the control valve V is opened, and for each secondary pressure fluid impulse delivered by the impulse converter the machine is supplied with a portion of lubricating oil.

What we claim is:

1. A pressure fluid impulse converter for transforming, at a predetermined rate, primary pressure fluid impulses of a higher frequency into secondary pressure fluid impulses of a lower frequency, in which the improvement comprises:

a positive displacement hydraulic pump (P) actuated by the primary pressure fluid impulses, the displacement of the hydraulic pump (P) being variable.

a pressure fluid supply valve (61) activatable from a closed to an opened position, to provide secondary pressure fluid impulses when activated to its opened position, an activating means (51) actuatable by pressure fluid from said hydraulic pump (P), said activating means (51) having a substantially larger displacement than said pump (P), and being arranged to be stepwise displaced by repeated strokes of said pump (P) so as to activate said valve (61) to its opened position after a predetermined number of said pump strokes, and means for varying the displacement of said pump (P) to thereby vary the impulse frequency transforming rate.

2. A pressure fluid impulse converter according to claim 1, comprising spring means for spring loading said activating means (51) toward its inactive position, and a check valve (25) located between said pump (P) and said activating means (51) so as to prevent return movement of said activating means after each pump stroke.

3. A pressure fluid impulse converter according to claim 1, wherein said activating means (51) comprises a hydraulically actuatable piston (52) and a push rod (53), said push rod (53) being rigidly connected to said piston (52) as a coaxial extension thereof and being arranged to engage said valve (61) by means of its outer end, said push rod (53) having a length such that in the rest position of said activating means (51) its outer end is spaced from said valve (61) by a distance which corresponds to a predetermined number of strokes of said pump (P).

4. A pressure fluid impulse converter according to claim 1, comprising a drain (78) in said activating means (51), and a return valve (73) in communication with said drain opening (78), said return valve being actuated by said secondary pressure impulses to open said drain opening (78) and thereby discharge the hydraulic fluid that has been fed into said activating means (51) during the activation displacement of said activating means (51).

5. A pressure fluid impulse converter according to claim 4, wherein said activating means comprises a hydraulically actuable piston (52), and said return valve (73) comprises a spindle (74) which by the secondary impulse pressure is longitudinally displaceable in coaxial relationship with said piston (52) of said activating means (51) to uncover said drain opening (78), said spindle (74) being returned to its rest position by said activating means (51) during the return movement of said piston (52) of said activating means (51).

6. A pressure fluid impulse converter according to claim 2, comprising a drain opening (78) in said activating means (51), and a return valve (73) in communication with said drain opening (78), said return valve being actuated by said secondary pressure impulses to open said drain opening (78) and thereby discharge the hydraulic fluid that has been fed into said activating means (51) during the activation displacement of said activating means (51).

7. A pressure fluid impulse converter according to claim 6, wherein said activating means comprises a hydraulically actuable piston (52), and said return valve (73) comprises a spindle (74) which by the secondary impulse pressure is longitudinally displaceable in coaxial relationship with said piston (52) of said activating means (51) to uncover said drain opening (78), said spindle (74) being returned to its rest position by said activating means (51) during the return movement of said piston (52) of said activating means (51).

8. A pressure fluid impulse converter according to claim 3, comprising a drain opening (78) in said activating means (51), and a return valve (73) in communication with said drain opening (78), said return valve being actuated by said secondary pressure impulses to open said drain opening (78) and thereby discharge the hydraulic fluid that has been fed into said activating means (51) during the activation displacement of said activating means (51).

9. A pressure fluid impulse converter according to claim 8, wherein said return valve (73) comprises a spindle (74) which by the secondary impulse pressure is longitudinally displaceable in coaxial relationship with said piston (52) of said activating means (51) to uncover said drain opening (78), said spindle (74) being returned to its rest position by said activating means (51) during the return movement of said piston (52) of said activating means (51).

* * * * *